United States Patent
Persson et al.

(10) Patent No.: US 7,779,409 B2
(45) Date of Patent: Aug. 17, 2010

(54) DEVICE-TO-DEVICE SOFTWARE DISTRIBUTION

(75) Inventors: Per Persson, Helsinki (FI); Younghee Jung, Helsinki (FI); Jim Lundin, Helsinki (FI)

(73) Assignee: Nokia Corporation, Espoo (FI)

( * ) Notice: Subject to any disclaimer, the term of this patent is extended or adjusted under 35 U.S.C. 154(b) by 1758 days.

(21) Appl. No.: 10/925,896

(22) Filed: Aug. 24, 2004

(65) Prior Publication Data

US 2006/0048141 A1      Mar. 2, 2006

(51) Int. Cl.
*G06F 9/45* (2006.01)
(52) U.S. Cl. .................................. 717/178
(58) Field of Classification Search .............. 717/178
See application file for complete search history.

(56) References Cited

U.S. PATENT DOCUMENTS

| | | | | |
|---|---|---|---|---|
| 5,951,639 | A * | 9/1999 | MacInnis | 725/70 |
| 6,701,521 | B1 | 3/2004 | McIlroy et al. | 717/173 |
| 2001/0034244 | A1* | 10/2001 | Calder et al. | 455/556 |
| 2004/0014486 | A1 | 1/2004 | Carlton et al. | |
| 2004/0095516 | A1* | 5/2004 | Rohlicek | 348/838 |
| 2005/0114468 | A1* | 5/2005 | Philyaw | 709/217 |
| 2005/0114530 | A1* | 5/2005 | Mangalik et al. | 709/229 |

FOREIGN PATENT DOCUMENTS

| | | |
|---|---|---|
| EP | 1164470 | 12/2001 |
| EP | 1347623 | 9/2003 |
| GB | 2294787 | 5/1996 |
| WO | WO 0144911 | 6/2001 |
| WO | WO 03/054574 | 7/2003 |
| WO | WO 03/073304 | 9/2003 |
| WO | WO 03/103316 | 12/2003 |
| WO | WO 2004/070589 | 8/2004 |

OTHER PUBLICATIONS

W3C Extensible Markup Language (XML) 1.0; W3C Recommendation Feb. 10, 1998; REC-xml-19980210 (pp. 1-32).
U.S. Appl. No. 10/389,624, filed Mar. 14, 2003, Jung, et al.

* cited by examiner

*Primary Examiner*—John Chavis
(74) *Attorney, Agent, or Firm*—Ware, Fressola, Van Der Sluys & Adolphson LLP

(57) ABSTRACT

A method and corresponding equipment by which software (11c) on a first device (11) is virally or otherwise distributed to a second device (12), in which the first device (11) and second device (12) and possibly also a server (16) of the software (11c) exchange information sufficient for the first device (11) to determine whether it includes or stores a version of the software (22c) compatible with the second device (12), and if so, then provides a compatible version, but otherwise exchanges information with the second device sufficient for the second device to obtain a copy from the server (16).

35 Claims, 1 Drawing Sheet

---

21 UserA mobile exchanges information with UserB mobile indicating a software application hosted on UserA mobile.

↓

22 UserA mobile provides to UserB mobile either a copy of the software application or information about where to download the software application depending on compatibility information provided by the UserB mobile and indicating whether the UserB mobile is compatible with any version of the software application stored on the UserA mobile.

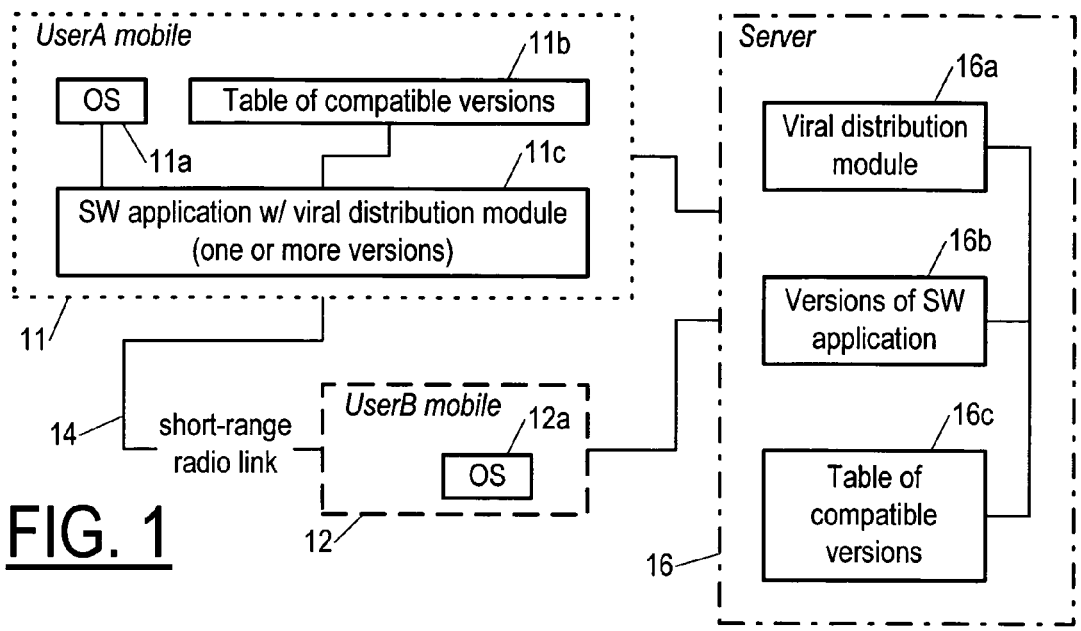
FIG. 1
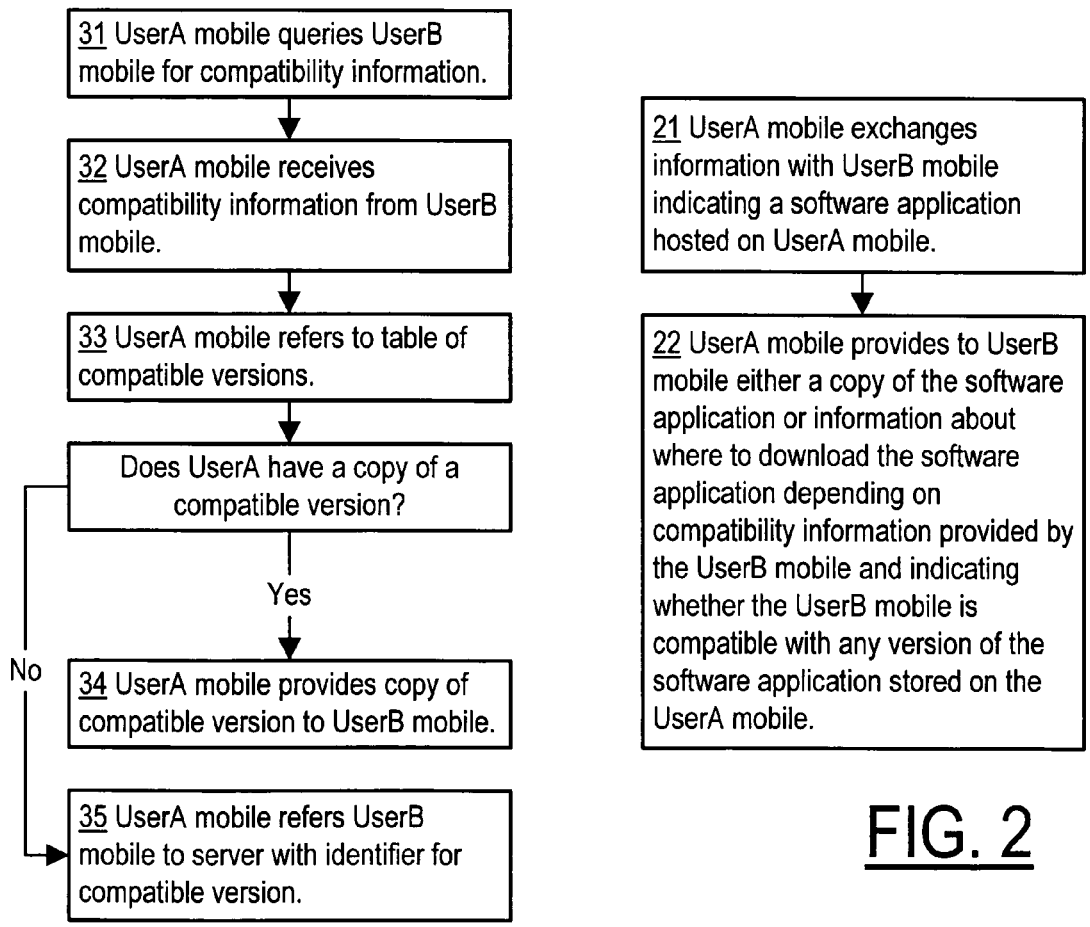
FIG. 2
FIG. 3

DEVICE-TO-DEVICE SOFTWARE DISTRIBUTION

TECHNICAL FIELD

The present invention pertains to the field of software distribution. More particularly, the present invention pertains to methods for copying software (operating system components or even applications) from one device to another, such as—and particularly advantageously—from one cellular telephone to another.

BACKGROUND ART

Although the present invention addresses a need that is more general, the invention is inspired by solving the problem of how to make it easier for mobile phone users to personalize their phones with features and functionalities that meet their needs. The invention provides a method for sharing and finding the correct phone software for use in a device, such as a mobile phone.

For installing software (SW) to mobile phones, SW is often downloaded from the Internet and exported from a PC to a mobile phone, which requires of course that a PC and phone be equipped in such a way that the PC can send SW files to the phone. If installing SW directly to a mobile phone over e.g. a GPRS network, finding the correct WAP website and then the correct SW product and version can be difficult when looking at the typically rather small display of a mobile phone. In case of updating SW installed on a PC, updater software is available to make the updating easy to do. For mobile phones there is a commercially available so-called Way Finder updater service for making updating on a mobile phone easier once the Way Finder updater application is installed In the mobile phone. For both the PC updater and the mobile phone updater, it is necessary to already have an earlier version of the SW installed on the device with the updater feature, or separate SW specifically for the updater functionalities.

In addition to the updater service, the prior art also provides for what is called viral distribution, which enables SW already hosted on a device to spread/distribute itself by simply sending a copied version of its installation file to another device, rather like a biological virus spreads. In this case, in order for the distributed file to work successfully, the other (target) device must be similar to or even the same as first (source) device. In viral distribution, UserA already has a piece of SW installed. From inside this SW application, UserA is allowed to send the SW to UserB. The advantages of the viral distribution are both social and technical. On the one hand, UserA already knows the SW and can tell UserB about what it does, which makes the SW choice easier for UserB (especially when advice comes from an acquaintance). But once UserA has sent the SW to UserB, UserA can also act as face-to-face technical support and instruct UserB on how to install the SW and make use of at least some of its features. This can be very valuable for consumers. In case of mobile phones, viral software distribution can be typically done using proximate radio (i.e. over a link provided by short-range radio, such as according to the Bluetooth protocol) or via an infrared link.

There are at least two problems with viral distribution according to the prior art. First, the SW developer has no control of the SW distribution, which makes it suitable only for free SW or SW sharing. Second, and more importantly, interoperability across phone models and operating platforms is not easy to provide. In practice, the phone models/platforms of UserA and UserB need to be similar or even the same in order for UserB to be able to install and utilize SW version received from UserA. Since according to the prior art, the sending user can still successfully send the SW version to another device without taking into consideration the compatibility of the receiving device, it could potentially frustrate both sending and receiving users to find that the distributed SW version is of no use on the recipient's device. In certain cases, the SW being thus virally distributed can be multi-version—i.e. can distribute as a file including various different versions of the SW—but then the SW package tends to be undesirably large, creating an additional burden to the users of the SW which can be often critically unacceptable due to the limited resources available on mobile devices. In most cases, ordinary consumers are not aware of, for instance, the differences between e.g. ISA and Symbian platforms, which greatly complicates efforts for virally distributing SW.

What is needed is a method in-between traditional over-the-air distribution and viral distribution, a method that ideally overcomes the above-described limitations of both.

DISCLOSURE OF THE INVENTION

Accordingly, in a first aspect of the invention, a method is provided, comprising: a step in which a first device exchanges information with a second device indicating a software application hosted on the first device; and a step in which the first device provides to the second device either a copy of the software application or information about where to download the software application depending on compatibility information provided by the second device indicating whether the second device is compatible with any version of the software application stored on the first device.

In accord with the first aspect of the invention, the compatibility information may be obtained by the first device sending a query to the second device asking for the compatibility information. Further, the query may include a command to the operating system of the second device prompting a response providing the compatibility information.

Also in accord with the first aspect of the invention, in response to the compatibility information, the first device may determine whether the second device is compatible based on information stored on the first device.

Also in accord with the first aspect of the invention, in response to the compatibility information, the first device may determine whether the second device is compatible by referring to information stored on another device.

Also in accord with the first aspect of the invention, the compatibility information may be obtained by the first device sending a query to the second device asking for an indication of compatibility and including information about the first device. Further, in response to the query, the second device may either itself provide an indication of compatibility or else obtain an indication of compatibility from a source of compatibility information and forward the indication of compatibility to the first device.

Also in accord with the first aspect of the invention, if the compatibility information indicates that the second device is not compatible, then the first device may refer to information stored on the first device to determine an address where a compatible version of the software application can be downloaded and may then provide the address to the second device.

Also in accord with the first aspect of the invention, if the compatibility information indicates that the second device is not compatible, then the first device may internally generate an address where a compatible version of the software application can be downloaded and may then provide the address to the second device.

Also in accord with the first aspect of the invention, if the compatibility information indicates that the second device is not compatible, then the first device may connect to a source of download address information and obtain an address where a compatible version of the software application can be downloaded and may then provide the address to the second device.

Also in accord with the first aspect of the invention, if the compatibility information indicates that the second device is not compatible, then the first device may send to the second device an address of a server, the second device may then connect to the server, and the server may then analyze the second device, determine which version or versions of the software application are compatible, and either provide a compatible version of the software application or provide an address where a compatible version can be downloaded.

Also in accord with the first aspect of the invention, the first device and the second device may communicate wirelessly, such as be a short-range wireless link or by a cellular link, and the path over which the first device and the second device communicate may include the Internet.

In a second aspect of the invention, a computer program product is provided, comprising: a computer readable storage structure (medium), such as a memory, embodying computer program code thereon for execution by a computer processor, with said computer program code characterized in that it includes instructions for causing an apparatus comprising the computer processor and computer readable medium embodying said computer program code to perform the steps of a method according to the first aspect of the invention.

In a third aspect of the invention, a device is provided, comprising: means for exchanging with another device information indicating a software application hosted on the device; and means by which the device provides to the other device either a copy of the software application or information about where to download the software application depending on compatibility information received from the other device indicating whether the other device is compatible with any version of the software application stored on the device.

In accord with the third aspect of the invention, the device may include means by which the compatibility information received from the other device is obtained according to the various ways of the first aspect of the invention.

In a fourth aspect of the invention, a device is provided, comprising: means for receiving from another device information indicating a software application hosted on the other device; and means for exchanging compatibility information with the other device for indicating whether the device is compatible with any version of the software application stored on the other device, and for receiving information indicating where the software application can be obtained or for receiving the software application, depending on whether the compatibility information indicates the device is compatible with any version of the software application stored on the other device.

In accord with the fourth aspect of the invention, in response to a query asking for an indication of compatibility and including information about the other device, the device may either itself provide an indication of compatibility or else obtain an indication of compatibility from a source of compatibility information and then forward the indication of compatibility to the other device.

In a fifth aspect of the invention, a system is provided, comprising: a first device as in the third aspect of the invention; and a second device, adapted for exchanging the compatibility information with the first device, and for receiving information indicating where the software application can be obtained or for receiving the software application, depending on whether the compatibility information indicates the second device is compatible with any version of the software application stored on the first device.

In accord with the fifth aspect of the invention, the system may further comprise a server, for providing a compatible version of the software application. Further, the server may analyze the second device to determine compatibility, and if the second device is found to be compatible with a version of the software application available from the server, then the server may provide to the second device a compatible version of the software.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a block diagram/flow diagram of a first device—illustrated as a mobile phone—hosting application SW, a second device—also illustrated as a mobile phone—to which the application SW is to be distributed, and a server for distributing the SW in case a version compatible with the second device is not included in the first device, with the first device, second device and server all configured for operation according to the invention.

FIG. 2 is flow chart illustrating a method according to the invention.

FIG. 3 is flow chart illustrating a method according to embodiments of the invention in which the first device determines whether it includes a compatible version, as opposed to embodiments in which the second device does so, possibly with the assistance of the server.

DETAILED DESCRIPTION OF THE INVENTION

The invention is here described in the particular case of distributing SW from one mobile device—such as a mobile phone—to another, and further, by using a short-range radio link. It should be understood however that the invention is of use for distributing SW from any kind of device to any other kind of device, and further, the invention is of use in using any sort of communication link between the two devices, including other wireless links, such as infrared or cellular links, and also including wireline links, and even including a communication path that traverses the Internet at least in part.

Referring now to FIG. 1, according to one embodiment of the invention, in case of a UserA mobile device 11—such as a mobile device—(operated by UserA) virally distributing SW 11c to a UserB mobile device 12 (operated by UserB), UserA first connects to UserB via a short-range radio link 14 (e.g. via Bluetooth, W-LAN, or IrDa). After the link 14 is established, there is an exchange of information indicating the SW to be virally distributed to the UserB device, and then the UserA device—and more particularly, typically the viral distribution SW 11c according to the invention and hosted by the UserA device—obtains from the UserB device what is here called compatibility information, i.e. information about the UserB device needed to determine a version of the SW compatible with the UserB device—information such as the mobile device model, the operating system (OS) 12a it uses, the platform it uses (i.e. the hardware), and possibly other technical specifications needed to identify a compatible SW version for the UserB device—or at least information sufficient for the UserA device to determine whether it has a compatible version for UserB device.

If the UserA mobile device finds that the UserB mobile device is compatible with one or another version of the SW on the UserA device, e.g. by referring to a table of compatible versions 11b stored on the UserA mobile device (possibly in connection with the SQ application 11c, the UserA mobile device 11 then sends a compatible version of the SW directly to the UserB mobile device 12 using the local radio link 14, and so without involving a server 16 having a store 16b of different versions of the SW 11c and accessible for distributing different versions of the SW, a server accessible to the UserA and UserB devices, e.g. on the Internet or elsewhere, such as on a cellular network. If the UserB mobile device 12 is for any reason incompatible with any version of the SW on the UserA mobile device 11, then the UserB device uses a URL (uniform resource locator) provided by the UserA device and indicating an address of a server 16 (on the Internet or elsewhere) where a compatible version can be downloaded, as described below.

Referring now also to FIG. 2, taking into account the embodiment described above as well as embodiments described below, the invention can be said to provide a method including a first step 21 in which the UserA mobile device 11 requests information from UserB mobile device 12 indicating a software application 11c hosted on UserA mobile device and receives UserB device's compatibility information from UserB device. In a second step 22, the UserA mobile device 11 provides to the UserB mobile device either a copy of the software application compatible with the UserB mobile device, or information about where to download a compatible version of the software application, the particular course followed depending on compatibility information provided by the UserB mobile device and indicating whether the UserB mobile device is compatible with any version of the software application 1c stored on the UserA mobile device.

Referring now to FIG. 3, in one particular embodiment a method is provided in which, after the exchange of information indicating the SW 11c to be distributed to the UserB mobile device 12, there is step 31 in which the UserA mobile device queries the UserB mobile device for the compatibility information. In a next step 32, the UserA mobile device receives compatibility information from UserB mobile device, compatibility information which in this embodiment is used by the UserA mobile device to determine whether any version of the SW 11c stored on the UserA mobile device is compatible with the UserB mobile device. In a next step 33, the UserA mobile device—and more specifically a viral distribution module component of the SW 11c—refers to the table 11b of compatible versions that typically links the compatibility information with identifiers of compatible versions (and, as described below, typically also provides a pinpoint or other URL for downloading in case of incompatibility), and then compares the compatibility information identifiers of the versions included/embedded in the SW module 11c and UserB device. Then the viral distribution module component makes a final determination as to compatibility, i.e. whether the UserA mobile device includes a compatible version. If so, then in a next step 34, the UserA mobile device provides a copy of a compatible version to the UserB mobile device. If not though, then in a next step 35, the UserA mobile device refers the UserB mobile device to the server 16 via a URL including an identifier for a compatible version, as described in more detail below.

The actual determination of compatibility can be done in different ways in different embodiments. One way—as described above—is for the UserA mobile device to obtain from the UserB mobile device the information necessary for the UserA mobile device to determine whether the SW on the UserA mobile device is compatible with the UserB mobile device. In some such embodiments, the UserA mobile device sends a request for the information to the UserB mobile device. The information requested can include e.g. the SW version of the phone's operating system. To obtain the SW version of the phone's operating system, the request can include a command to execute a macro function that results in the phone indicating the operating system version of the phone. In some mobile devices, the command to indicate the operating system version is "*#0000#" and so that command would be embedded in the request by the UserA phone. (Depending on the operating system version of the UserB phone, the UserB phone may first seek from UserB a permission to respond to the command to indicate the operating system, and further, may require platform-level support for security reasons.) For other information, corresponding other commands may be used. Then the UserA mobile device (typically a module of the SW being distributed) checks for compatibility with the UserB mobile device using, for example, a small database included on the UserA mobile device of compatible devices in order to determine compatibility locally. It is also of course possible that the UserA mobile device (typically a module of the SW being distributed) would refer to a database hosted by a server on the Internet or elsewhere (e.g. a wireless telecommunications network) in order to determine compatibility given the information received from the UserB mobile device.

Another way in which compatibility can be determined is for the UserA mobile device to send a request to the UserB mobile device asking that the UserB mobile device check compatibility itself, based on information about the UserA mobile device (such as the OS 11a of the UserA mobile device and typically hardware/platform information) that the UserA mobile device includes in the request. In such embodiments, if the UserB mobile device (typically the UserB OS 12a) determines that the UserB mobile device is compatible with the SW on UserA, then the UserB mobile device can respond with a simple "Yes" to UserA.

As a variant of the way where UserB determines compatibility based on information provided by UserA, the UserB mobile device can further provide the information about its operating system to the UserA mobile device if the UserB mobile device determines it is compatible with the subject SW, thus allowing the UserA mobile device to make a precise determination of what version of the SW to distribute (i.e. to provide to the UserB mobile device).

As another variant, the UserB mobile device can inquire of the server 16 as to compatibility, sending to the server both the information provided by the UserA mobile device as well as its own information, and then forward the response to the UserA mobile device. A viral distribution module 16a of the server 16 would typically determine a version of the SW 11c compatible with the UserB mobile device, using a table 16c of compatible versions.

Now in case it is determined—in any of the above-described ways—that the UserB mobile device is not compatible with any version of the SW 11c on the UserA mobile device, or in case of embodiments in which the UserB mobile device uses the server 16 to determine a compatible version, the invention provides that the UserA mobile device send a URL to the UserB mobile device indicating an address on the Internet or other network where the correct SW for UserB can be downloaded or where a determination of compatibility can be made, assumed here to be the address of the server 16 including the viral distribution module 16a. The invention provides several ways the URL can be determined.

The simplest way is for the UserA mobile device 11 to include in the table 11b of compatible versions a URL for each compatible version. In this process, the URL provided to the UserB mobile device should include an indication of the correct SW version so that the UserB mobile device automatically ends up linked precisely to the location where the correct version to download is provided for download, or at least where the correct version can be found with minimum navigational efforts. For example, the SW version can be included in the URL as a parameter.

Another way for the UserA mobile device to determine the URL (and required parameters) for a compatible version is for the UserA mobile device to obtain the URL from the server 16 by providing the server with either an identifier of a compatible version, or information about the UserB device (i.e. the target device in which the SW is going to be downloaded) that the server can use to determine a compatible version. In this, the UserA mobile device is assumed to know a general URL of the server 16, but not the (pinpoint) URL for a compatible version. Upon receiving the URL from the server, the UserA mobile device forwards the URL to the UserB mobile device. After receiving the URL from the UserA device, the UserB device can then link to the site indicated by the URL and download the subject SW. As before, the URL provided to the UserB mobile device should include an indication of the correct SW version so that the UserB mobile device automatically ends up linked precisely to the server location where the correct version to download is provided for download.

Yet another way for the UserA mobile device to determine a (pinpoint) URL for a compatible version (in case the SW version locally available in UserA device is found incompatible) is partly similar to the immediately preceding method to begin with, but differs in the later part of the process. In this other way, the UserA mobile device sends to the UserB mobile device a generic URL for the server with a particular parameter appended to it instead of the pinpoint URL where the correct SW for UserB device is located for download. Such a generic server URL would link the user to a site that could potentially provide all versions of the subject SW and possibly other SW, and with a particular parameter appended to the URL the server is able to detect that the connecting device is requesting the compatibility analysis and react accordingly. Upon receiving the link to the server 16, the UserB mobile device connects to the server, and the server checks and analyzes the UserB hardware and installed software (e.g. the operating system). On the basis of the said analysis, the server sends the correct version of the subject SW to the UserB mobile device. Note that in this embodiment, the UserA mobile device is merely checking for compatibility (and determines that the UserA mobile device is not compatible with any version of the subject SW residing on the UserA mobile device, which reduces the required information about other versions of SW to be installed on UserA device), whereas the server is responsible for the detailed analysis of the UserB mobile device in order to determine what version of the subject SW to send to the UserB mobile device. In such an embodiment, the server should be able to request relevant information from UserB device, determine the correct SW version and generate the appropriate page interface for the UserB mobile device.

In yet another alternative embodiment, the UserA mobile device can use an algorithm—called here a URL generator algorithm—to automatically generate the (pinpoint) URL for a compatible version of the SW 11c. In such an embodiment, no table or database of URLs—such as the table 11b of compatible versions—need be stored. Such an embodiment of course requires that the server website and its URLs be organized according to the same algorithm used by the UserA mobile device, i.e. that the server and the URL generator algorithm be synchronized. The synchronization could be fairly trivial since the server website and the developer of the subject SW will typically be the same company. Although different SW will have different requirements, the URL generator algorithm could, for instance, take information about mobile device model and operating system version and produce a URL such as the following:

www.company.com/download/8600/symbian_v8.5, i.e. such as:
www.company.com/download/hardware-identifier/OS-identifier.

If the URL generator algorithm in the mobile device 11 and the web/wap site structure of the server 16 are synchronized so as to allow a systematically generated URL such as the above, a URL can be generated not only for existing phone models/platforms/OS versions, but for future releases too, i.e. the URL generator algorithm could then provide a URL even for SW developed after the URL generator algorithm.

The invention thus taps into all the advantages of viral distribution described above, but makes distribution simpler and more reliable when two different device models are involved. With the invention, unsuccessful viral distribution attempts can be prevented thus reducing the potential frustration of users, and SW providers can ensure that SW viral distribution is likely to always produce an intended result, e.g. delivering a correct version of SW, or a direct URL to download the correct SW, or, minimally, a link to a site where the compatibility is automatically checked and a download link can then be generated. Both technology savvy users as well as the not so savvy users can benefit from the invention, since with the invention a user need not navigate the Internet to find the correct SW version, but can instead rely on a received URL for the correct (and specific) place for SW download.

In contrast to prior art, in case a mobile device does not have the correct SW version, the viral distribution provided by the invention includes downloading SW from a server, which makes it possible to charge for and control the SW downloaded. This may make the here-described method more attractive for the SW industry than prior art viral distribution.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   exchanging information between a first device and a second device indicating a software application hosted on the first device;
   obtaining, by the first device from the second device, compatibility information,
   determining if said first device is stored with any version of the software application compatible with the second device, based on said compatibility information, and
   providing a copy of the software application from the first device to the second device, if said first device is stored with any version of the software application compatible with the second device, or
   providing information from the first device to the second device about where to download the software application, if the first device is not stored with any version of the software compatible with the second device.

2. A method as in claim 1, wherein the compatibility information is obtained by the first device sending a query to the second device asking for the compatibility information.

3. A method as in claim 2, wherein the query includes a command to the operating system of the second device prompting a response providing the compatibility information.

4. A method as in claim 1, wherein in response to the compatibility information, the first device determines whether the second device is compatible based on information stored on the first device.

5. A method as in claim 1, wherein in response to the compatibility information, the first device determines whether the second device is compatible by referring to information stored on another device.

6. A method as in claim 1, wherein the compatibility information is obtained by the first device sending a query to the second device asking for an indication of compatibility and including information about the first device.

7. A method as in claim 6, wherein in response to the query, the second device either itself provides an indication of compatibility or else obtains an indication of compatibility from a source of compatibility information and forwards the indication of compatibility to the first device.

8. A method as in claim 1, wherein if the compatibility information indicates that the second device is not compatible, then the first device refers to information stored on the first device to determine an address where a compatible version of the software application can be downloaded and provides the address to the second device.

9. A method as in claim 1, wherein if the compatibility information indicates that the second device is not compatible, then the first device internally generates an address where a compatible version of the software application can be downloaded and provides the address to the second device.

10. A method as in claim 1, wherein if the compatibility information indicates that the second device is not compatible, then the first device connects to a source of download address information and obtains an address where a compatible version of the software application can be downloaded and then provides the address to the second device.

11. A method as in claim 1, wherein if the compatibility information indicates that the second device is not compatible, then the first device sends to the second device an address of a server, the second device connects to the server, and the server analyzes the second device, determines which version or versions of the software application are compatible, and either provides a compatible version of the software application or provides an address where a compatible version can be downloaded.

12. A method as in claim 1, wherein the first device and the second device communicate wirelessly.

13. A method as in claim 1, wherein the first device and the second device communicate using a short-range wireless link.

14. A method as in claim 1, wherein the first device and the second device communicate using a cellular link.

15. A method as in claim 1, wherein the first device and the second device communicate over a path that includes the Internet.

16. A computer readable medium embodying computer program code thereon for execution by a computer processor, with said computer program code characterized in that it includes instructions for performing the steps of the method of claim 1.

17. An apparatus, comprising:
means for exchanging with another apparatus information indicating a software application hosted on the apparatus;
means for obtaining from the other apparatus, compatibility information,
means for determining if the apparatus is stored with any version of the software application compatible with the other apparatus, based on said compatibility information, and
means for providing to the other apparatus a copy of the software application if it is determined that the apparatus is stored with any version of the software application compatible with the other apparatus, and for providing information about where to download the software application if it is determined that the apparatus is not stored with any version of the software application compatible with the other apparatus.

18. An apparatus as in claim 17, wherein the apparatus is configured to obtain the compatibility information by sending a query to the other apparatus asking for the compatibility information.

19. An apparatus as in claim 18, wherein the query includes a command to the operating system of the other apparatus prompting a response providing the compatibility information.

20. An apparatus as in claim 17, further comprising means for determining whether the other apparatus is compatible based on the compatibility information and also based on information stored on the apparatus.

21. An apparatus as in claim 17, further comprising means, responsive to the compatibility information, for determining whether the other apparatus is compatible by referring to information stored on still another apparatus.

22. An apparatus as in claim 17, further comprising means for obtaining the compatibility information by sending a query to the other apparatus asking for an indication of compatibility and including information about the apparatus.

23. A system, comprising:
a first apparatus as in claim 17; and
a second apparatus, adapted for exchanging the compatibility information with the first apparatus, and for receiving information indicating where the software application can be obtained if said first apparatus determines it is not stored with any version of the software application compatible with the second apparatus, or for receiving the software application if said apparatus determines it is stored with any version of the software application compatible with the other apparatus.

24. A system as in claim 23, further comprising a server, for providing a compatible version of the software application.

25. A system as in claim 24, wherein the server is configured to analyze the second apparatus to determine compatibility, and if the second apparatus is found to be compatible with a version of the software application available from the server, then to provide to the second apparatus a compatible version of the software.

26. An apparatus, comprising:
means for receiving from another apparatus information indicating a software application hosted on the other apparatus; and
means for exchanging compatibility information with the other apparatus for indicating whether the apparatus is compatible with any version of the software application stored on the other apparatus, for receiving information indicating where the software application can be obtained if the compatibility information indicates the apparatus is not compatible with any version of the software application stored on the other apparatus, and for receiving the software application if the compatibility information indicates the apparatus is compatible with any version of the software application stored on the other apparatus.

27. An apparatus as in claim 26, wherein the apparatus is configured so that in response to a query asking for an indication of compatibility and including information about the other apparatus, the apparatus either itself provides an indication of compatibility or else obtains an indication of compatibility from a source of compatibility information and forwards the indication of compatibility to the other apparatus.

28. An apparatus, comprising at least one processor and at least one memory storing computer program code, wherein the at least one memory and stored computer program code are configured to, with the at least one processor, cause the apparatus to at least:
 exchange with another apparatus information indicating a software application hosted on the apparatus;
 obtain compatibility information from the other apparatus, determine if said apparatus is stored with any version of the software application compatible with the other apparatus, based on said compatibility information, and
 provide to the other apparatus a copy of the software application if said first device determines it is stored with any version of the software application compatible with the second device, or provide to the other apparatus information about where to download the software application, if the first device determines it is not stored with any version of the software compatible with the second device.

29. An apparatus as in claim 28, wherein the at least one memory and stored computer program code are configured to, with the at least one processor, cause the apparatus to obtain the compatibility information by sending a query to the other apparatus asking for the compatibility information.

30. An apparatus as in claim 29, wherein the query includes a command to the operating system of the other apparatus prompting a response providing the compatibility information.

31. An apparatus as in claim 28, wherein the at least one memory and stored computer program code are configured to, with the at least one processor, cause the apparatus to determine whether the other apparatus is compatible based on the compatibility information and also based on information stored on the apparatus.

32. An apparatus as in claim 28, wherein the at least one memory and stored computer program code are configured to, with the at least one processor, cause the apparatus to the compatibility information by determining whether the other apparatus is compatible by referring to information stored on still another apparatus.

33. An apparatus as in claim 28, further wherein the at least one memory and stored computer program code are configured to, with the at least one processor, cause the apparatus obtain the compatibility information by sending a query to the other apparatus asking for an indication of compatibility and including information about the apparatus.

34. An apparatus, comprising at least one processor and at least one memory storing computer program code, wherein the at least one memory and stored computer program code are configured to, with the at least one processor, cause the apparatus to at least:
 receive from another apparatus information indicating a software application hosted on the other apparatus;
 exchange compatibility information with the other apparatus for indicating whether the apparatus is compatible with any version of the software application stored on the other apparatus; and
 receive information indicating where the software application can be obtained if the compatibility information indicates the apparatus is not compatible with any version of the software application stored on the other apparatus, or receive the software application if the compatibility information indicates the apparatus is compatible with any version of the software application stored on the other apparatus.

35. An apparatus as in claim 34, wherein the at least one memory and stored computer program code are configured to, with the at least one processor, cause the apparatus to respond to a query asking for an indication of compatibility and including information about the other apparatus by either itself providing an indication of compatibility or else obtaining an indication of compatibility from a source of compatibility information and forwarding the indication of compatibility to the other apparatus.

\* \* \* \* \*